US011303658B2

(12) United States Patent
Mathew

(10) Patent No.: US 11,303,658 B2
(45) Date of Patent: Apr. 12, 2022

(54) SYSTEM AND METHOD FOR DATA ANALYSIS AND DETECTION OF THREAT

(71) Applicant: Marlabs Innovations Private Limited, Bengaluru (IN)

(72) Inventor: Bimodh Jo Mathew, Piscataway, NJ (US)

(73) Assignee: MARLABS INCORPORATED

( * ) Notice: Subject to any disclaimer, the term of this patent is extended or adjusted under 35 U.S.C. 154(b) by 175 days.

(21) Appl. No.: 16/108,518

(22) Filed: Aug. 22, 2018

(65) Prior Publication Data

US 2020/0067953 A1 Feb. 27, 2020

(51) Int. Cl.
*H04L 29/06* (2006.01)

(52) U.S. Cl.
CPC ...... *H04L 63/1425* (2013.01); *H04L 63/0227* (2013.01); *H04L 63/1433* (2013.01); *H04L 63/302* (2013.01)

(58) Field of Classification Search
CPC H04L 63/1425; H04L 63/302; H04L 63/0227
See application file for complete search history.

(56) References Cited

U.S. PATENT DOCUMENTS

| | | | | |
|---|---|---|---|---|
| 8,458,301 B1 * | 6/2013 | Andrus | ............... | H04L 41/0672 709/220 |
| 9,386,034 B2 * | 7/2016 | Cochenour | ......... | H04L 63/1416 |
| 9,413,774 B1 * | 8/2016 | Liu | ..................... | H04L 63/1416 |
| 9,934,166 B2 * | 4/2018 | Wilkerson | .......... | G06F 12/1483 |
| 9,935,975 B2 * | 4/2018 | Wilkerson | ............ | H04L 63/145 |
| 10,044,736 B1 * | 8/2018 | Barger | .................. | H04L 63/145 |
| 10,212,182 B2 * | 2/2019 | Wetterwald | ......... | H04L 63/0227 |
| 10,372,905 B1 * | 8/2019 | McClintock | .......... | G06F 21/566 |
| 10,579,942 B2 * | 3/2020 | Vasseur | .................. | G06N 20/00 |

(Continued)

FOREIGN PATENT DOCUMENTS

| | | |
|---|---|---|
| GN | 106850293 A | 1/2017 |
| KR | 101852107 B1 | 11/2017 |
| WO | 2017115272 A1 | 12/2015 |

OTHER PUBLICATIONS

RFSID, 5 Phases of the Threat Intelligence Lifecycle (https://www.recordedfuture.com/threat-intelligence-lifecycle/ Viewed on Jul. 6, 2018).

(Continued)

*Primary Examiner* — Viral S Lakhia
(74) *Attorney, Agent, or Firm* — Jason C. Cameron

(57) ABSTRACT

System and method for data analysis and detection of threat are provided. The system includes a processing subsystem. The processing subsystem includes a reconnaissance module configured to acquire data from one or more internal sources and one or more external sources. The data from the one or more internal sources includes the data from at least one of a firewall, a router and a security solution. The data from the one or more external sources includes the data from at least one of a deep web, a dark web and a surface web. The processing subsystem also includes an analysis module configured to analyse the data by using at least one threat analysis method for detection of threat and a dissemination module configured to present detected threat in one or more forms. The system also includes a memory configured to store data acquired from the one or more sources.

6 Claims, 3 Drawing Sheets

(56) References Cited

U.S. PATENT DOCUMENTS

| | | | | |
|---|---|---|---|---|
| 10,897,470 | B2* | 1/2021 | Sharma | H04L 9/3242 |
| 2009/0067440 | A1* | 3/2009 | Chadda | H04L 45/74 |
| | | | | 370/401 |
| 2009/0204610 | A1 | 8/2009 | Hellstrom et al. | |
| 2017/0060112 | A1* | 3/2017 | Pirner | G06F 21/79 |
| 2017/0366571 | A1* | 12/2017 | Boyer | H04L 63/1433 |
| 2018/0159852 | A1* | 6/2018 | Crabtree | H04L 63/105 |
| 2018/0183766 | A1* | 6/2018 | Crabtree | H04L 63/0815 |
| 2018/0219894 | A1* | 8/2018 | Crabtree | H04L 63/1425 |
| 2018/0288073 | A1* | 10/2018 | Hopper | G06Q 20/4016 |
| 2018/0295154 | A1* | 10/2018 | Crabtree | H04L 63/1408 |
| 2019/0007440 | A1* | 1/2019 | Lavi | G06Q 50/26 |
| 2019/0035027 | A1* | 1/2019 | Ng | H04L 63/20 |
| 2019/0166155 | A1* | 5/2019 | Steele | H04L 63/1408 |
| 2019/0199626 | A1* | 6/2019 | Thubert | H04L 45/64 |

OTHER PUBLICATIONS

MarkMonitor, Dark Web Threat Intelligence to Protect Against Cyberattacks (https://markmonitor.com/download/ds/ds-MarkMonitor_Dark_Web_Cyber_Intelligence.pdf Viewed on Jul. 6, 2018).

* cited by examiner

SYSTEM AND METHOD FOR DATA ANALYSIS AND DETECTION OF THREAT

FIELD OF INVENTION

Embodiments of the present disclosure relate to threat detection, and more particularly to a system and method for data analysis and detection of threat.

BACKGROUND

With linear growth in the technology, internet has become a source for immense quantities of data, which is used for various purposes by different organizations. One such purpose includes detecting a threat for the organization such as malicious activity or hacking. In general, the data in the internet is classified between surface web and deep web, which includes dark well it is well known today, that most of the illegal activities or planning for a malicious activity take place in the deep web. Therefore, acquisition and analysis of data from the deep web has become important for the organizations to identify potential threats.

Conventional systems utilized by the organizations for detecting threats are capable of acquiring data from the surface web, which includes data that is accessible by the well-known search engines. However, the conventional systems are unable to acquire data from the deep web as acquisition of data from the deep web requires advanced web crawlers capable of accessing the deep web. Furthermore, additional security protocols are required to be maintained by the system for maintaining anonymity.

In comparison to the conventional systems, newer systems are capable of acquiring data from the deep web as the newer systems employ advanced crawlers and security protocols to acquire the data from the deep web. Moreover, the newer systems have limited data acquisition capabilities as the newer systems employ to acquiring the data from either the deep web or an internal source associated with the newer system. Consequently, the data acquisition is limited to either the deep web or the internal source. Such limitations confine the amount of data being acquired by the newer system because of which the detection of the threat by the newer system is less efficient.

Hence, there is a need for an improved system and method for data analysis and detection of threat to address the aforementioned issues.

BRIEF DESCRIPTION

In accordance with one embodiment of the disclosure, a system for data analysis and prediction of threat is provided. The system includes a processing subsystem. The processing subsystem includes a reconnaissance module configured to acquire data from one or more internal sources and one or more external sources. The data from the one or more internal sources includes the data from at least one of a firewall, a router and a security solution. The data from the one or more external sources includes the data at least one of a deep web, a dark web and a surface web. The processing subsystem also includes an analysis module operatively coupled to the reconnaissance module. The analysis module is configured to analyse the data by using at least one threat analysis method for detection of threat. The processing subsystem also includes a dissemination module operatively coupled to the analysis module. The dissemination module is configured to present detected threat in one or more forms. The system also includes a memory operatively coupled to the processing subsystem. The memory is configured to store data acquired from the one or more internal sources and the one or more external sources.

In accordance with another embodiment of the present disclosure a method for analysing data and detection of threat is provided. The method includes acquiring data from one or more internal sources and one or more external sources. The acquiring of the data from the one or more internal sources includes acquiring the data from the at least one of a firewall, a router and a security solution associated with the one or more internal sources. The acquiring of the data from at least one of a deep web, a dark web and a surface web associated with the one or more external sources. The method also includes analysing an acquired data by using at least one threat analysis method for detection of threat. The method also includes presenting an analysed data in one or more forms.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
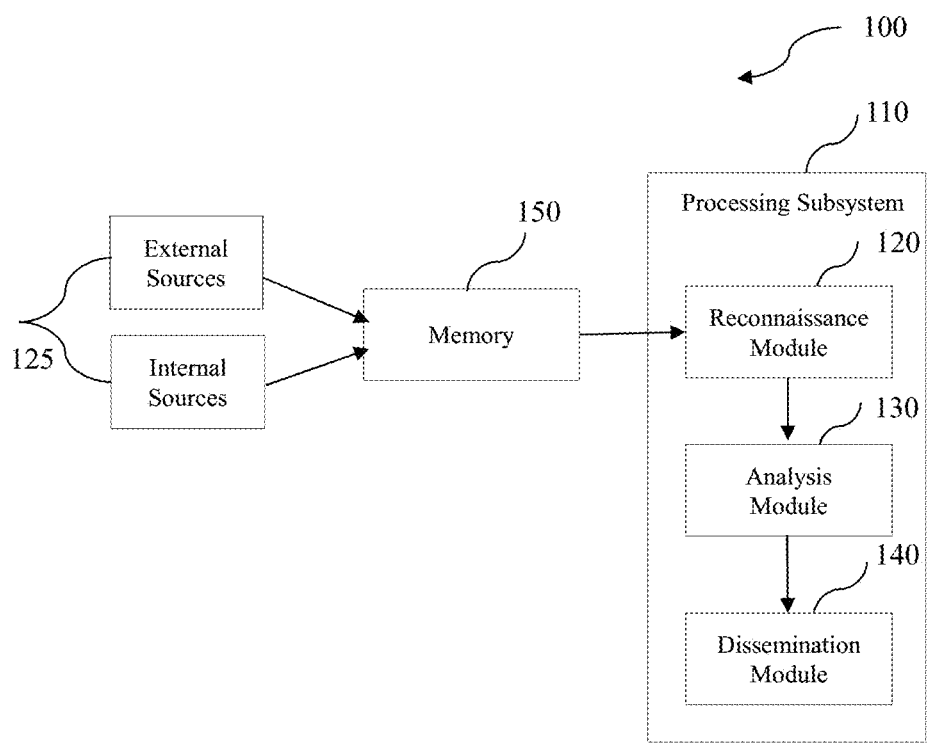
FIG. 1 is a block diagram of a system for data analysis and detection of threat in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for data analysis and detection of threat. The system includes a processing subsystem. The processing subsystem includes a reconnaissance module configured to acquire data from one or more internal sources and one or more external sources. The data from the one or more internal sources includes the data at least one of a firewall, a router and a security solution. The data from the one or more external sources includes the data from at least one of a deep web, a dark web and a surface web. The processing subsystem also includes an analysis module operatively coupled to the reconnaissance module. The analysis module is configured to analyse the data by using at least one threat analysis method for detection of threat. The processing subsystem also includes a dissemination module operatively coupled to the analysis module. The dissemination module is configured to present detected threat in one or more forms. The system also includes a memory operatively coupled to the processing subsystem. The memory is configured to store data acquired from the one or more internal sources and the one or more external sources.

FIG. 1 is a block diagram of a system (100) for data analysis and detection of threat in accordance with an embodiment of the present disclosure. World wide web includes surface web, dark web and deep web which is referred to as one or more external sources. Further, content of the one or more external sources is not indexed by a standard search engine. Such one or more external sources is used by people to perform malicious activities such as hacking. Therefore, the present system (100) is employed to acquire data from the one or more external sources (125) and one or more internal sources (125). The one or more external sources (125) are accessed by people through the one or more internal sources. The acquired data is further analysed to detect threats such as hacking.

The system (100) includes a processing subsystem (110). The processing subsystem (110) includes a reconnaissance module (120) configured to acquire data from one or more internal sources (125) and one or more external sources (125). The one or more internal sources (125) includes the data from at least one of a firewall, a router and a security solution. As used herein, the term 'firewall' is defined as a network security system used to protect the system which monitors and controls movement of network traffic. Also, the term 'router' is defined as is defined as a networking device which forwards data packets between a plurality of computer networks. Further, the term 'security solution' is defined as a plurality of techniques which is configured to protect computer, network, data from unauthorised access or attacks.

Furthermore, the one or more external sources (125) includes the data from at least one of a deep web, a dark web and a surface web. As used herein, the term 'deep web' is defined as part of the world wide web contents which are not indexed by standard web engines for any reason. As used herein, the term 'dark web' is defined as the world wide web content which exists on darknets, on a computer networks built on a top of another network which uses interact but require specific software, configurations or authorization to access. As used herein, the term 'surface web' is defined as the portion of the world wide web content that is readily available to the general public and searchable with standard web search engines.

In one embodiment, the reconnaissance module (120) may access the one or more internal sources (125) and the one or more external sources (125) through one or more crawlers using a web server. In such embodiment, the one or more crawlers may access the data based on one or more parameters. In one embodiment the one or more parameters may include at least one of a keyword, content of search and a search string which may be used previously to access the data from the one or more internals sources or the one or more external sources. In one specific embodiment, the reconnaissance module (120) may be communicatively coupled to at least one virtual computing device which may be configured to enable the reconnaissance module (120) to access the data from the one or more external sources based on the one or more parameters.

In another embodiment, the data from the one or more internal sources (125) may include the data associated with at least one of an audit report, a vulnerability assessment report and the like based on which the reconnaissance module (120) may access and acquire the data from the one or more internal sources (125) and the one or more external sources (125).

The processing subsystem (110) also includes an analysis module (130) operatively coupled to the reconnaissance module (120). The analysis module (130) is configured to analyse the data by using at least one threat analysis method for detection of threat. In one embodiment, the at least one threat analysis method may include at least one of a co-relation analysis technique, a behavioural analysis technique and a contextual analysis technique. As used herein, the term 'co-relation analysis' is defined as a method of statistical evaluation used to study the strength of a relationship between two numerically measured, continuous variables. In one embodiment, the at least one of a correlation analysis method may include a Pearson co-relation analysis, Kendall rank co-relation analysis, Spearman correlation analysis and point-biserial correlation analysis.

As used herein, the term 'behavioural analysis' is defined as a method that reveals new insights into the behaviour of consumers on electronic-commerce platforms, online games, web, mobile applications, and internet of things. As used herein, the term 'contextual analysis' is defined as a method of studying text and the cultural, social, or political context of the text. In one embodiment, the contextual analysis may include a method of qualitative comparative analysis methods (QCA). As used herein, the term 'QCA' is defined as an analysis method which uses statistical techniques to implement comparison methods for making detailed analysis with the content of the data acquired. In some embodiment, the one or more QCA method may include one or more methods such as crisp-set qualitative comparative analysis methods (csQCA) and fuzzy-set qualitative comparative analysis (fsQCA) methods.

In one exemplary embodiment, the reconnaissance module (120) may combine the data extracted form the one or more internals sources (125) and the one or more external sources (125). Further, combined data is transmitted to the analysis module (130) for further analyses of the combined data to detect the threat. In such embodiment, the analysis module (130) may analyse one or more elements from the combined data based on which the threat may be analysed using the at least one analysis method. The one or more elements may include at least one of a context of the data, depth of the context of the data, relationship between the context and the one or more parameters, interaction or communication within the one or more internal sources (125) and the one or more external sources (125) based on the context of the data.

In one specific embodiment, the analysis module (130) may analyse the data in real-time to detect the threat. Furthermore, the analysis module (130) may analyse and determine a type of the threat, one or more existing threats, one or more upcoming threats and the like. In such embodiment, the analysis module (130) may further detect the threat to at least one of a specific environment, a specific geographical area, a specific sector of an organization and the like which may be affected, or which may face the detected threat.

The processing subsystem (110) also includes a dissemination module (140) operatively coupled to the analysis module (130). The dissemination module (140) is configured to present the detected threat in one or more forms. In one embodiment, the one or more forms may include representing in at least one of a report, a dashboard, a structured threat information expression (STIX) and an application programming interface (API) form. As used herein, the term 'report' is defined as a type of an informal work which may be in a form of a writing, a speech, a film or the like which may be used to relay information or events in a presentable form. Also, the term 'dashboard' is defined as a type of graphical summary of the information displayed to give an overview of the information.

As used herein, the term 'API' is defined as a set of function, a definition, a protocol, and a tool for building software. Also, the term 'protocol' is defined as the valid sequence of messages which flows between the APIs of multiple parties to accomplish some higher-level task. Further, the term 'STIX' is defined as a technique which is used for describing threat information. Such threat information may be stored, analysed and shared in a pre-defined method.

In one exemplary embodiment, the dissemination module (140) may generate an alert notification upon detecting the threat and a level of threat associated with the analysed data from the one or more internal sources (125) and the one or more external sources (125).

The system (100) also includes a memory (150) operatively coupled to the processing subsystem (110). The memory (150) is configured to store the data acquired from the one or more internal sources (125) and the one or more external sources (125). In some embodiment, the processing subsystem (110) operatively coupled to the memory (150) may be stored on a remote storage. As used herein, the term 'remote storage' is defined as a storage element which is used to store data in a remote server which may be accessed through the Internet. In one embodiment, the data may be stored on a cloud storage which may be further retrieved by the analysis module (130) for further analyses and the prediction of the threat. In such embodiment, the remote storage system may help to host, edit, share and sync stored data on the web server.

In one exemplary embodiment, the memory (150) may correspond to a network attached storage (NAS). As used herein, the term 'NAS' is defined as a file level computer data storage server which is connected to a computer network for providing data access to the user. Further, the NAS may provide data access to heterogeneous group of users.

Figure 2:
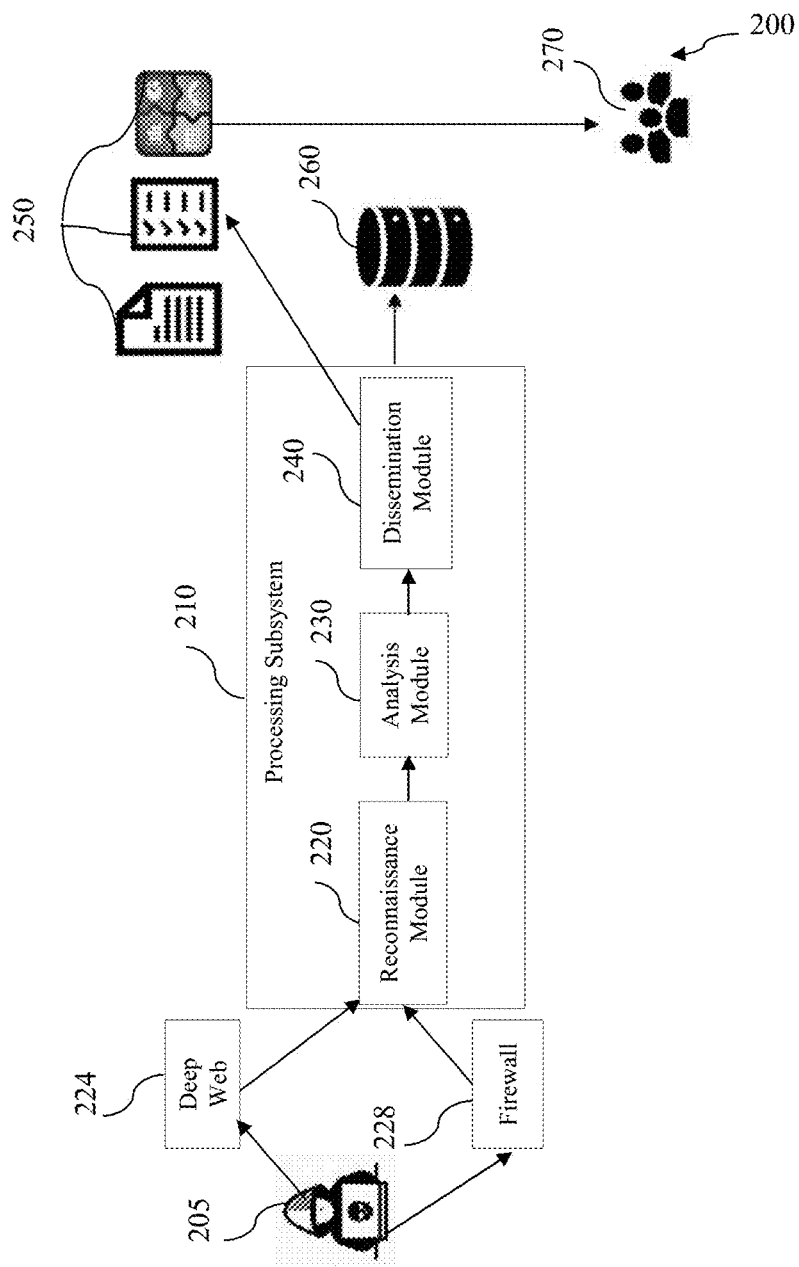
FIG. 2 is a schematic representation of an exemplary system for data analysis and detection of threat of FIG. 1 in accordance with an embodiment of the present disclosure.

FIG. 2 is a schematic representation of an exemplary system for data. analysis and detection of threat of FIG. 1 in accordance with an embodiment of the present disclosure. The system (200) represented in FIG. 2 is substantially similar to the system (100) of FIG. 1. The system (200) includes a processing subsystem (210) operatively coupled to the memory (260). The processing subsystem (210) also includes a reconnaissance module (220), an analysis module (230) and a dissemination module (240). The system (200) is utilized for detection of threat by analysis of data. For example, if a hacker (205) trying to hack the data of online financial transaction, the hacker requires one or more details of the transaction process. Such cybercrimes or attacks are generally offered over external source such as deep web (224). In such a scenario, the illegal content of data from the deep web and an internet server associated with the financial transaction is accessed by using search engines.

The illegal content of data generated due to illegal activities such as hacking is utilised for detection of threat by using several data analysis techniques. To detect the threat, data is acquired from the deep web and the internet server using a reconnaissance module (220). Here, the acquired data from the deep web and the internet server is integrated together to get a set of combined data. Furthermore, the combined data is analysed by using an analysis module (230) by using a plurality of analysis methods.

For example, the analysis module (230) may use a corelation analysis method where, after combining the data, bi-variate analysis for measuring the strength of association between two variables and direction of the relationship is done. Similarly, behavioural analysis method is also used for analysis of the combined data. Also, contextual analysis of the acquired data is done in order to understand the context of the combined data. After, understanding the context of the text data using qualitative comparative analysis technique, threat associated with the online financial transaction is detected.

The data obtained after detection of threat is further delivered to a dissemination module (240) in one or more forms (250) to right audiences (270) by presenting in a right format for creating a warning and also to identify the process of threat. For example, the data is disseminated to the audiences (270) in form of a report. The report contains the structured information about the threat detected to make the audience aware before performing further financial transactions. Also, the acquired data from the deep web and the internet server is stored on a cloud storage so that the data may be easily hosted, edited, shared and synced by one or more users.

Figure 3:
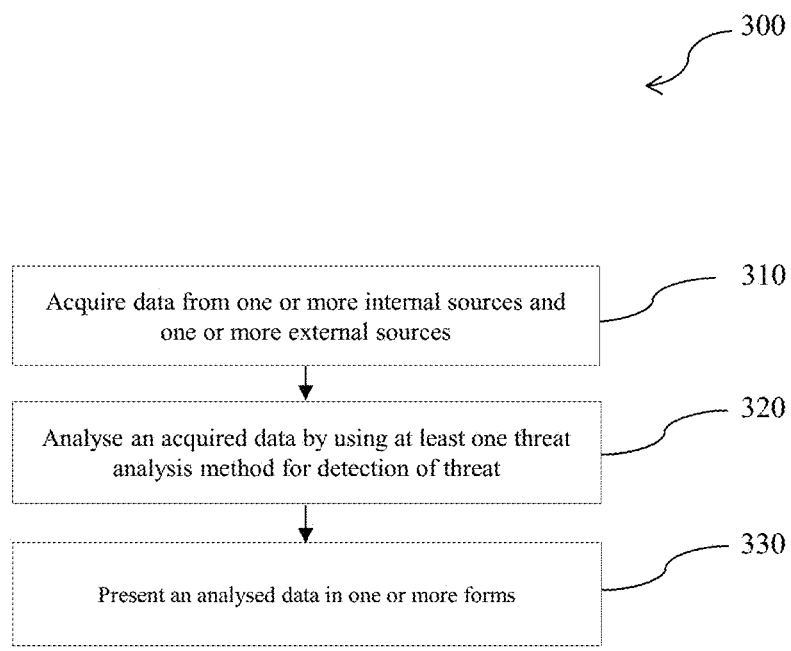
FIG. 3 is a flow chart representing the steps involved in a method for analysing data and detection of threat in accordance with the embodiment of the present disclosure.

FIG. 3 is a flow chart representing the steps involved in a method (300) for analysing data and detection of threat in accordance with the embodiment of the present disclosure. The method (300) includes acquiring data from one or more internal sources and one or more external sources in step 310. Acquiring the data from the one or more internal sources includes acquiring the data from the at least one of a firewall, a router and a security solution associated with the one or more internal sources. Acquiring the data from at least one of a deep web, a dark web and a surface web associated with the one or more external sources.

In one embodiment, acquiring the data from the one or more internal sources and the one or more external sources may include acquiring the data by a reconnaissance module. In another embodiment, acquiring the data from the one or more internal sources may include acquiring the data associated with at least one of an audit report, a vulnerability assessment report and the like.

In one exemplary embodiment, the method may include combining the data acquired form the one or more internal sources and the one or more external sources for obtaining combined data.

The method (300) also includes analysing an acquired data by using at least one threat analysis method for detection of threat in step 320. In one embodiment, analysing the acquired data by using the at least one threat analysis method may include analysing the data by using at least one of a co-relation analysis technique, a behavioural analysis technique and a contextual analysis technique. In one exemplary method, analysing the data may include analysing the data by an analysis module which may be operatively coupled to the reconnaissance module.

The method (300) also includes presenting an analysed data in one or more forms in step 330. In one embodiment, presenting the analysed data in the one or more forms may include presenting the analysed data in at least one of a report, a dashboard, a structured threat information expression and an application programming interface. In one specific embodiment, presenting the analysed data may include presenting the analysed data by a dissemination module which may be operatively coupled to the analysis module. In another embodiment, the method may include generating an alert notification upon detecting the threat based on one or more elements, wherein the one or more elements may include at least one of a context of the data, depth of the context of the data, relationship between the context and the one or more parameters, interaction or communication within the one or more internal sources and the one or more external sources based on the context of the data.

Furthermore, in one embodiment, the method (300) may include storing the data acquired from the one or more internal sources and the one or more external sources on a remote storage. In such embodiment, storing the data may include storing the data on a cloud storage. In one exemplary embodiment, the method may further include storing the analysed data on the remote storage.

Various embodiments of the present disclosure enable the system to acquire the data from the one or more internal sources and the one or more external sources which increases the amount of the data being collected, also the efficiency of the data analysis increases and hence increases the efficiency of threat detection. Also, the system enables the threat detection in real-time by analysing the data on a single platform which is secured, consumes less time and improves accuracy of detection.

Moreover, the present disclosed system helps in identifying and detecting fraud which affects one or more users of one or more industries such as banking, software engineering and insurance companies by using analysis and prediction techniques which not only alerts the one or more users but also provides better insights for an industry to organise and manage data in a better way.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for data analysis, detection, and prediction of a threat comprising:
 a processing subsystem with a memory comprising:
  a reconnaissance module configured to acquire the data from one or more internal sources and one or more external sources, wherein the data from the one or more internal sources comprise data from at least one of a firewall, a router and a security solution and wherein the data from the one or more external sources comprises the data from at least one a deep web, a dark web, and a surface web, wherein the reconnaissance module is communicatively coupled to at least one virtual computing device configured to enable the reconnaissance module to access the data from one or more sources based on one or more parameters to include at least one of a keyword, a content of a search, and a search string;
  an analysis module operatively coupled to the reconnaissance module, and configured to analyze the data by using a threat analysis method detects the threat to at least one of a specific environment, a specific sector of an organization, and wherein the analysis module analyses one or more elements includes at least one of a context of the data, depth of the context of the data, a relationship between the context and one or more parameters, and one or more parameters, and one or more external sources based on the context of the data, and wherein the threat analysis comprises of a co-relation analysis technique, a behavioural analysis techniques and a contextual analysis technique;
   wherein the co-relation analysis technique includes at least one of Pearson co-relation analysis, Kendall rank co-relation analysis, Spearman co-relation analysis and a point-biserial co-relation analysis, the behavioural analysis technique includes studying the behaviour of consumer on electronic commerce platforms, online games, web applications and internet of things, and the contextual analysis technique includes studying text and the cultural, social, or political context of the text;
  a dissemination module operatively coupled to the analysis module and configured to present a detected threat in one or more forms, wherein the dissemination module generates an alert notification upon detecting the threat and a level of threat associated with the analyzed data; and wherein the memory is operatively coupled to the processing subsystem and configured to store the data acquired from the one or more internal sources and the one or more external sources.

2. The system as claimed in claim 1, wherein the one or more forms comprises at least one of a report, a dashboard, a structured threat information expression, and an application programming interface.

3. The system as claimed in claim 1, wherein the memory operatively coupled to the processing subsystem is stored on a remote storage location.

4. A method for analyzing data for prediction and detection of a threat comprising:

acquiring, by a reconnaissance module, data from one or more internal sources and one or more external sources, wherein acquiring the data from the one or more internal sources and the one or more external sources comprises:

acquiring the data from the at least one of a firewall, a router, and a security solution associated with the one or more internal sources; and acquiring the data from at least one of a deep web, a dark web and a surface web associated with the one or more external sources;

analyzing, by an analysis module, acquired data by using a threat analysis method for detection of a threat wherein the threat analysis method comprises of a co-relation analysis technique, a behavioural analysis technique and a contextual analysis technique; and wherein the co-relation analysis technique includes at least one of Pearson co-relation analysis, Kendall rank co-relation analysis, Spearman co-relation analysis and a point-biserial co-relation analysis, the behavioural analysis technique includes studying the behaviour of consumer on electronic commerce platforms, online games, web applications and internet of things, and the contextual analysis technique includes studying text and the cultural, social, or political context of the text;

presenting, by a dissemination module, analyzed data in one or more forms.

5. The method as claimed in claim 4, wherein presenting, by the dissemination module, the analyzed data in the one or more forms comprises presenting the analyzed data in at least one of a report, a dashboard, a structured threat information expression and an application programming interface.

6. The method as claimed in claim 5, further comprising storing, by the memory operatively coupled to a processing subsystem, the data acquired from the one or more internal sources and the one or more external sources on a remote storage location.

* * * * *